(12) United States Patent
Chihara

(10) Patent No.: US 7,681,205 B2
(45) Date of Patent: Mar. 16, 2010

(54) CONNECTION MONITORING AND DRIVER MANAGEMENT METHOD AND APPARATUS AND PROGRAM THEREFOR

(75) Inventor: Tatsuya Chihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 950 days.

(21) Appl. No.: 10/939,379

(22) Filed: Sep. 14, 2004

(65) Prior Publication Data

US 2005/0210480 A1 Sep. 22, 2005

(30) Foreign Application Priority Data

Mar. 17, 2004 (JP) ............................. 2004-076901

(51) Int. Cl.
*G06F 9/44* (2006.01)
*G06F 9/445* (2006.01)

(52) U.S. Cl. ...................................... 719/327; 717/174

(58) Field of Classification Search ................. 719/310, 719/318, 322, 327, 321; 717/174–177; 710/8, 710/9, 10, 15; 709/224
See application file for complete search history.

(56) References Cited

U.S. PATENT DOCUMENTS

| | | | | |
|---|---|---|---|---|
| 6,081,850 | A * | 6/2000 | Garney | 710/15 |
| 6,282,711 | B1 * | 8/2001 | Halpern et al. | 717/175 |
| 6,336,152 | B1 * | 1/2002 | Richman et al. | 710/8 |
| 6,442,754 | B1 * | 8/2002 | Curtis | 717/175 |
| 6,530,018 | B2 * | 3/2003 | Fleming, III | 713/1 |
| 6,631,521 | B1 * | 10/2003 | Curtis | 717/175 |
| 6,714,992 | B1 * | 3/2004 | Kanojia et al. | 719/321 |
| 6,718,463 | B1 * | 4/2004 | Malik | 713/2 |
| 6,836,794 | B1 * | 12/2004 | Lucovsky et al. | 709/223 |
| 6,842,766 | B2 * | 1/2005 | Brockway et al. | 709/203 |
| 6,993,760 | B2 * | 1/2006 | Peev et al. | 717/174 |
| 7,017,155 | B2 * | 3/2006 | Peev et al. | 717/176 |
| 7,073,172 | B2 * | 7/2006 | Chamberlain | 717/169 |
| 7,107,588 | B2 * | 9/2006 | Gentry | 717/176 |
| 7,143,408 | B2 * | 11/2006 | Anderson et al. | 717/175 |
| 7,150,025 | B2 * | 12/2006 | Gentry et al. | 719/327 |
| 7,228,541 | B2 * | 6/2007 | Gupton et al. | 717/175 |
| 7,295,986 | B2 * | 11/2007 | Hayakawa | 705/1 |
| 2002/0083430 | A1 * | 6/2002 | Kusuda et al. | 717/174 |
| 2003/0145317 | A1 * | 7/2003 | Chamberlain | 717/177 |
| 2004/0088718 | A1 * | 5/2004 | Sprague | 719/322 |

(Continued)

FOREIGN PATENT DOCUMENTS

JP A-2000-353079 12/2000

(Continued)

OTHER PUBLICATIONS

Dec. 8, 2009 Office Action for Japanese Application No. 2004-076901.

*Primary Examiner*—Van H Nguyen
(74) *Attorney, Agent, or Firm*—Oliff & Berridge, PLC

(57) ABSTRACT

Disclosed is a driver managing method using a driver managing apparatus for managing a driver corresponding to an output device connected through a network. The driver managing apparatus monitors change in a network environment including the presence or absence of a connection to the network and detects the output device connected to the network when the connection to the network has been confirmed, and installs the driver corresponding to the detected output device.

16 Claims, 9 Drawing Sheets

U.S. PATENT DOCUMENTS

| | | | |
|---|---|---|---|
| 2004/0143830 A1* | 7/2004 | Gupton et al. | 717/174 |
| 2004/0255291 A1* | 12/2004 | Sierer et al. | 717/174 |
| 2005/0050339 A1* | 3/2005 | Himmel et al. | 713/189 |
| 2005/0132352 A1* | 6/2005 | Shen | 717/174 |

FOREIGN PATENT DOCUMENTS

| | | |
|---|---|---|
| JP | A-2002-288110 | 10/2002 |
| JP | A 2002-366502 | 12/2002 |
| JP | A-2003-6133 | 1/2003 |
| WO | WO 2004/021720 A1 | 3/2004 |

\* cited by examiner

| NETWORK | OUTPUT DEVICE |
|---|---|
| 5A (192.168.1.0/24) | 1A-1, 1A-2, 1A-3, 1A-4, 1A-5 |
| 5B (192.168.2.0/26) | 1B |
| 5C (192.168.2.64/26) | 1C-1, 1C-2 |
| 5D (192.168.2.128/25) | 1D-1, 1D-2, 1D-3 |

FIG. 7A

| OUTPUT DEVICE | 1A-1 | 1A-2 | ... |
|---|---|---|---|
| MODEL | A A A | B B B | ... |
| ADDRESS | 192.168.1.50 | 192.168.1.100 | ... |
| OPTION | NONE | xxx | ... |
| ⋮ | ⋮ | ⋮ | ... |

FIG. 7B

CONNECTION MONITORING AND DRIVER MANAGEMENT METHOD AND APPARATUS AND PROGRAM THEREFOR

BACKGROUND OF THE INVENTION

1. Field of the Invention

The present invention relates to a driver management method and apparatus and a program therefor, more particularly to a driver management method and apparatus and a program therefor for managing drivers of output devices used by a terminal device whose network environment changes, such as a portable terminal device or the like.

2. Description of the Related Art

In recent years, opportunities for using output devices such as printers, facsimile machines, and the like through a network have increased in conjunction with the development of network technology.

On the other hand, opportunities for using portable terminal devices such as notebook type personal computers (PCs), portable information terminals, and the like have also increased recently.

The portable terminal device has a high possibility that a network environment it uses changes each time the place of use is moved, so that if the network environment changes, the output device used also changes in many cases. For this reason, with the portable terminal device, each time the network environment changes, it becomes necessary to install a driver of the output device used and provide a setting for the installed driver, and these operations have been troublesome for users.

To overcome such problems, a technique has been proposed in which at the time of the starting of the terminal device, a printer on the network is detected, and a driver corresponding to the detected printer is automatically installed (e.g., refer to Japanese Patent Application Laid-Open No. 2002-366502).

However, in the technique disclosed in the aforementioned publication Japanese Patent Application Laid-Open No. 2002-366502, since the driver of the printer is already installed at the time of the starting of the terminal device, in a case where the terminal device in its started state is moved to a place of a different network environment, it is impossible to cope with the case. For this reason, when the terminal device is moved to a place of a different network environment, it has been necessary for the user to move the terminal device after cutting off its power supply, or restart the terminal device after the movement.

SUMMARY OF THE INVENTION

Accordingly, it is an object of the present invention to provide a driver management method and apparatus and a program therefor, which make it possible to manage the driver of the output device so that the output device can be used in the network environment after the movement without effecting the restarting or the like of the terminal device.

To attain the above object, in accordance with an aspect of the present invention, there is provided a driver managing method using a driver managing apparatus for managing a driver corresponding to an output device connected through a network, comprising: monitoring a change in a network environment including the presence or absence of a connection to the network; and detecting the output device connected to the network when the connection to the network has been confirmed, and installing the driver corresponding to the detected output device.

In accordance with another aspect of the present invention, there is provided a driver managing apparatus for managing a driver corresponding to an output device connected through a network, comprising: a network-environment monitoring unit which monitors a change in a network environment including the presence or absence of a connection to the network; and a connect processing unit which detects the output device connected to the network when the connection to the network has been detected by the network-environment monitoring unit, and installs the driver corresponding to the detected output device.

In accordance with still another aspect of the present invention, there is provided a driver managing program for managing a driver corresponding to an output device connected through a network, comprising: a network-environment monitoring step for monitoring a change in a network environment including the presence or absence of a connection to the network; and a connect processing step for detecting the output device connected to the network when the connection to the network has been detected in the network-environment monitoring step, and for installing the driver corresponding to the detected output device, wherein a computer executes the network-environment monitoring step and the connect processing step.

In accordance with the present invention, since the configuration is provided such that a change in the network environment is monitored, and when the connection to the network has been confirmed, the output device on the network is detected, and a corresponding driver is installed, even in a case where the terminal device is moved to a place of a different network environment, it becomes possible for the user to use the output device in the network environment after the movement without performing the installing operation of the driver.

BRIEF DESCRIPTION OF THE DRAWINGS

Preferred embodiments of the present invention will be described in detail based on the following figures, wherein:

FIGS. 7A and 7B are diagrams illustrating examples of driver information.

DESCRIPTION OF THE PREFERRED EMBODIMENTS

Referring now to the accompanying drawings, a detailed description will be given of an embodiment of a driver management method and apparatus and a program therefor in accordance with the present invention.

First Embodiment

Figure 1:
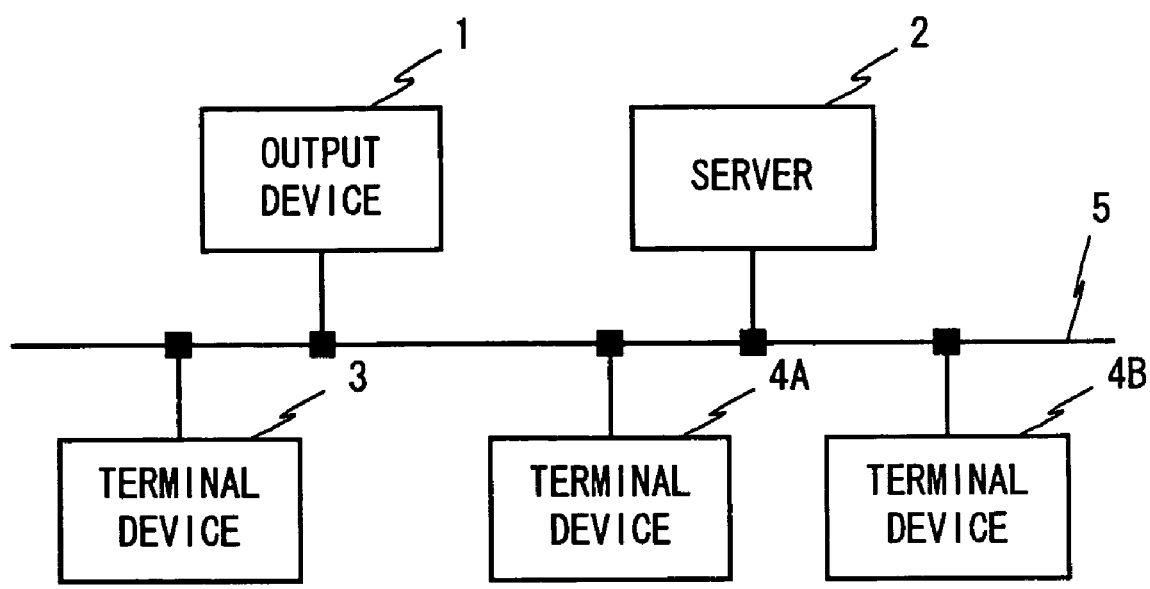
FIG. 1 is a diagram illustrating an example of the configuration of a network including terminal devices in accordance with the present invention.

FIG. 1 is a diagram illustrating an example of the configuration of a network including terminal devices in accordance with the present invention. In the example of the configuration shown in the drawing, an output device 1, a server 2, a terminal device 3, a terminal device 4A, and a terminal device 4B are connected through a network 5.

The output device 1 is an output device such as a printer, a facsimile machine, or the like, and requires the use of a driver when it is used. The server 2 provides various services in the network 5. The terminal device 3 is one to which the present invention is applied, and the terminal device 3 is used by a user when the output device 1 or the server 2 is used. The terminal devices 4A and 4B are similar to the terminal device 3.

Figure 2:
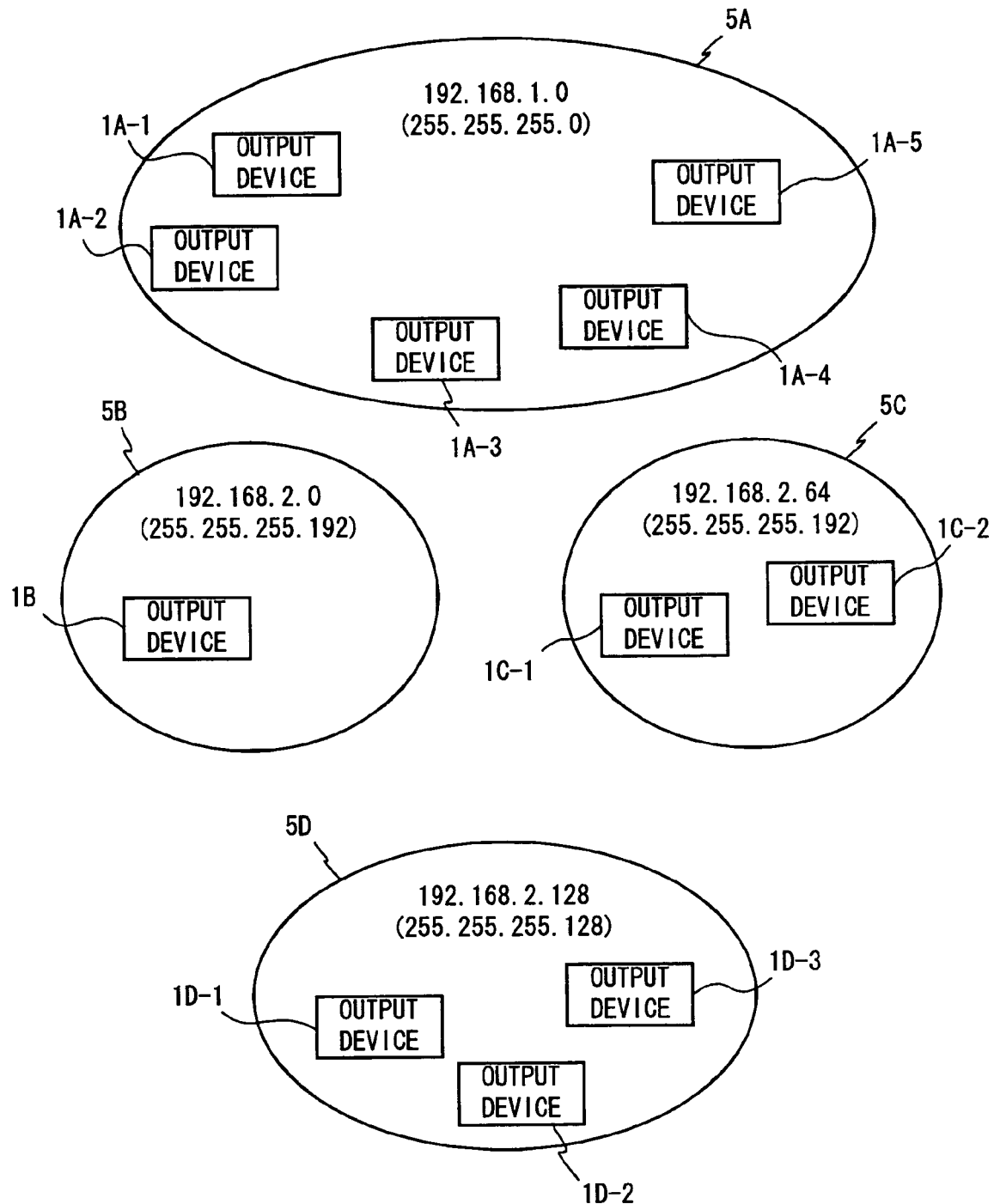
FIG. 2 is a diagram illustrating examples of the configuration of networks.

The terminal device 3 to which the present invention is applied is a portable one, and it is assumed that its connection is allowed in any one of a network 5A, a network 5B, a network 5C, and a network 5D shown in FIG. 2.

It should be noted that the network 5A is a network whose network address is "192.168.1.0/24," i.e., whose usable addresses range from "192.168.1.0" to "192.168.1.255." An output device 1A-1, an output device 1A-2, an output device 1A-3, an output device 1A-4, and an output device 1A-5 are connected to this network 5A.

Similarly, the network 5B is a network whose network address is "192.168.2.0/26" (in the range from "192.168.2.0" to "192.168.2.63"), and an output device 1B is connected to this network 5B.

Further, the network 5C is a network whose network address is "192.168.2.64/26" (in the range from "192.168.2.64" to "192.168.2.127"), and an output device 1C-1 and an output device 1C-2 are connected to this network 5C.

The network 5D is a network whose network address is "192.168.2.128/25" (in the range from "192.168.2.128" to "192.168.2.255"), and an output device 1D-1, an output device 1D-2, and an output device 1D-3 are connected to this network 5D.

In such network configurations, whichever network the terminal device 3 is connected to, the terminal device 3 is capable of readily using the output devices connected to the respective networks.

Figure 3:
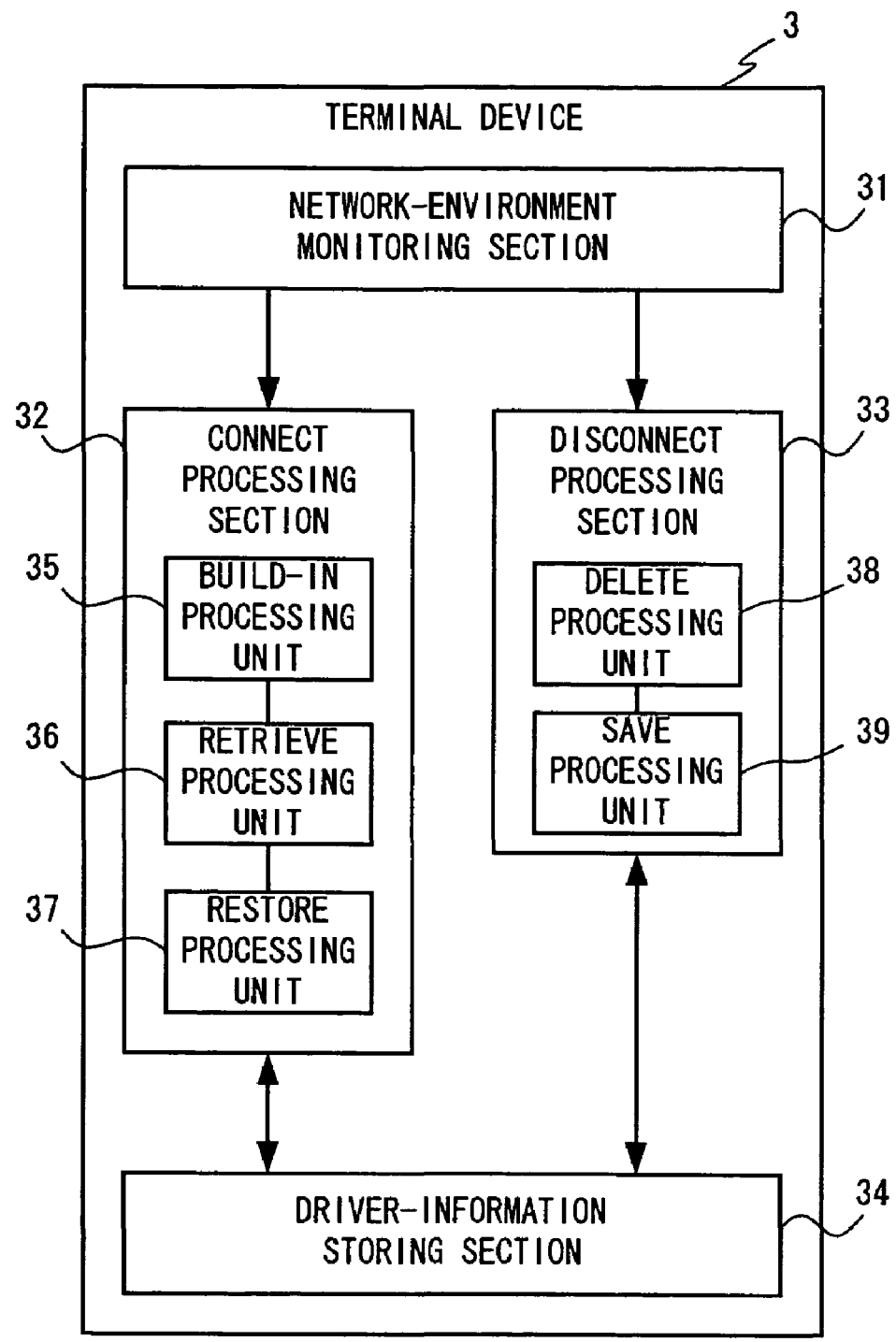
FIG. 3 is a block diagram illustrating a functional configuration of a terminal device 3.

Here, a description will be given of the terminal device 3. FIG. 3 is a block diagram illustrating a functional configuration of the terminal device 3. It should be noted that, in FIG. 3, those functional parts that are similar to those of the conventional art, i.e., various functional parts for operating as the terminal device, are omitted, and only portions pertaining to the present invention are shown.

As shown in the drawing, the terminal device 3 is configured by including a network-environment monitoring section 31, a connect processing section 32, a disconnect processing section 33, and a driver-information storing section 34.

The network-environment monitoring section 31 monitors the network environment of the terminal device 3, and detects that the terminal device 3 is newly connected to the network, and that the terminal device 3 is disconnected from the connected network.

The connect processing section 32 includes a build-in processing unit 35, a retrieve processing unit 36, and a restore processing unit 37. When it is detected by the network-environment monitoring section 31 that the terminal device 3 has been connected to a network, the connect processing section 32 executes connect processing such as the installation of the driver of an output device available in that network. In this connect processing, the build-in processing unit 35 installs the driver; the retrieve processing unit 36 retrieves an available output device; and the restore processing unit 37 restores a driver which was previously installed and is recoverable.

The disconnect processing section 33 includes a delete processing unit 38 and a save processing unit 39, and when it is detected by the network-environment monitoring section 31 that the terminal device 3 has been disconnected from a network, the connect processing section 32 executes disconnect processing such as the uninstallation of the driver of the output device which was available in that network. In this disconnect processing, the delete processing unit 38 uninstalls the driver, and the save processing unit 39 saves the uninstalled driver so that it can be restored later.

The driver-information storing section 34 stores driver information concerning the driver installed by the connect processing section 32 and the driver saved by the disconnect processing section 33.

It should be noted that various functional parts of the terminal device 3 shown in FIG. 3 can be realized by operating the terminal device 3 in accordance with a program. In that case, only the network-environment monitoring section 31 is configured as a functional part which constantly operates, and the connect processing section 32 and the disconnect processing section 33 are configured so as to be appropriately started by the network-environment monitoring section 31. In addition, as the driver-information storing section 34, it is possible to made use of an unillustrated storage unit such as a hard disk provided in the terminal device 3.

Figure 4:
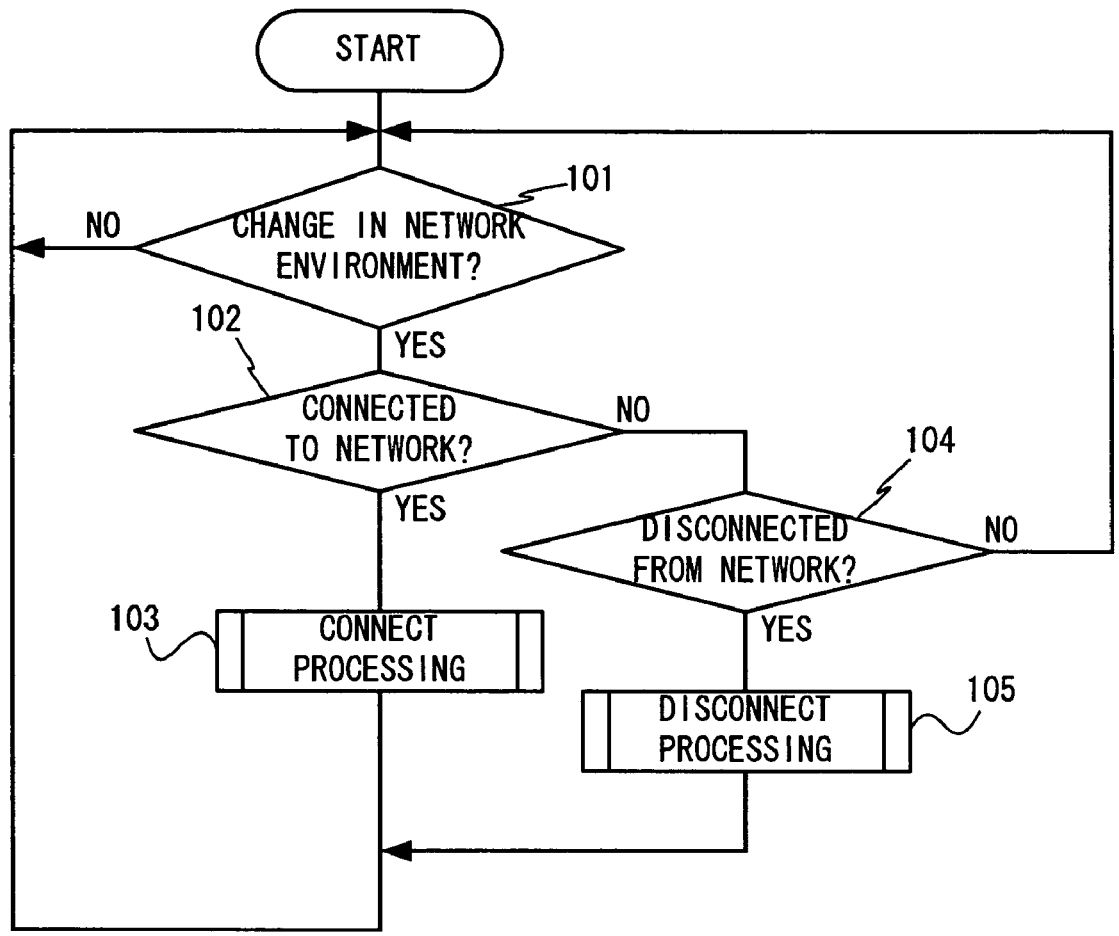
FIG. 4 is a flowchart illustrating the flow of operation of the terminal device 3.

Next, a description will be given of the operation of the terminal device 3. FIG. 4 is a flowchart illustrating the flow of operation of the terminal device 3.

When the terminal device 3 is started, the network-environment monitoring section 31 starts its operation to monitor a change in the network environment (NO in Step 101).

In a case where the network-environment monitoring section 31 detects a change in the network environment (YES in Step 101), and that change is a connection to the network (YES in Step 102), the connect processing section 32 executes connect processing (Step 103). Then, upon completion of the connect processing by the connect processing section 32, the network-environment monitoring section 31 monitors again a change in the network environment (NO in Step 101). It should be noted that a description will be given later of the connect processing.

On the other hand, if the network-environment monitoring section 31 detects a change in the network environment (YES in Step 101), and that change is a disconnection from the network (No in Step 102, YES in Step 104), the disconnect processing section 33 executes disconnect processing (Step 105). Then, upon completion of the disconnect processing by the disconnect processing section 33, the network-environment monitoring section 31 monitors again a change in the network environment (NO in Step 101). It should be noted that a description will be given later of the disconnect processing.

Figure 5:
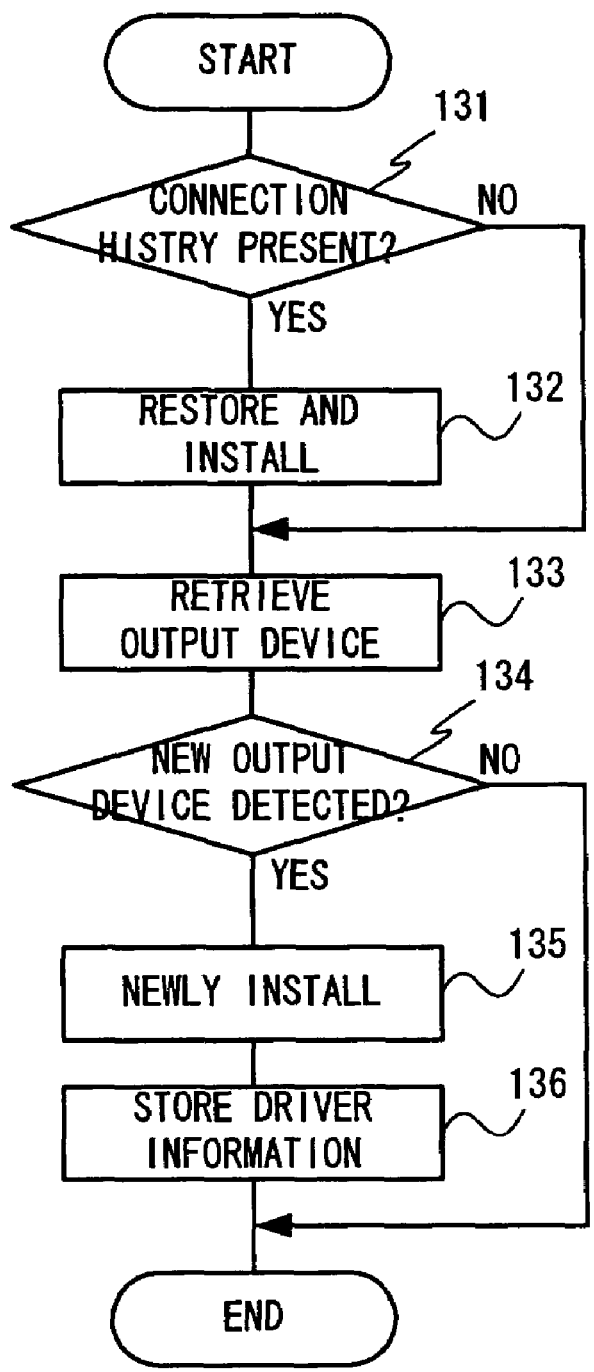
FIG. 5 is a flowchart illustrating the flow of connect processing.

Next, a description will be given of the operation of the connect processing by the connect processing section 32. FIG. 5 is a flowchart illustrating the flow of the disconnect processing.

Upon starting the connect processing, the connect processing section 32 determines whether or not connection to the connected network was carried out in the past. This determination is made on the basis of whether the network address of the connected network is stored in the driver-information storing section 34, i.e., whether or not there is a connection history. As a result of it, if there was a past connection to the connected network (YES in Step 131), the restore processing unit 37 executes the restore and install processing (Step 132), and if there was no connection in the past (NO in Step 131), the restore and install processing is not executed.

The restore and install processing by the restore processing unit 37 is processing for restoring the driver saved in the disconnect processing, which will be described later. It is the processing in which a group of files constituting a driver is fetched from the driver-information storing section 34 and is returned to a location similar to that at the time of installation, and setting information concerning that driver is fetched from the driver-information storing section 34 and a setting is provided for that driver.

Subsequently, in the connect processing section 32, the retrieve processing unit 36 effects retrieval of an output device available in the connected network (Step 133). As a result of it, if a new output device has been detected, i.e., an output device corresponding to a driver which is not stored in the driver-information storing section 34 and which could not be restored and installed has been detected (YES in Step 134), the build-in processing unit 35 newly installs the driver of that output device (Step 135). Then, information on the installed driver is stored in the driver-information storing section 34 (Step 136), thereby completing the connect processing. It should be noted that in a case where the connected network is a network which has been connected for the first time, all the detected output devices become new output devices.

Incidentally, if the terminal device 3 does not have a driver to be newly installed, the build-in processing unit 35 fetches the driver from such as the server 2 (or a device corresponding to the server 2) and effects installation.

Figure 6:
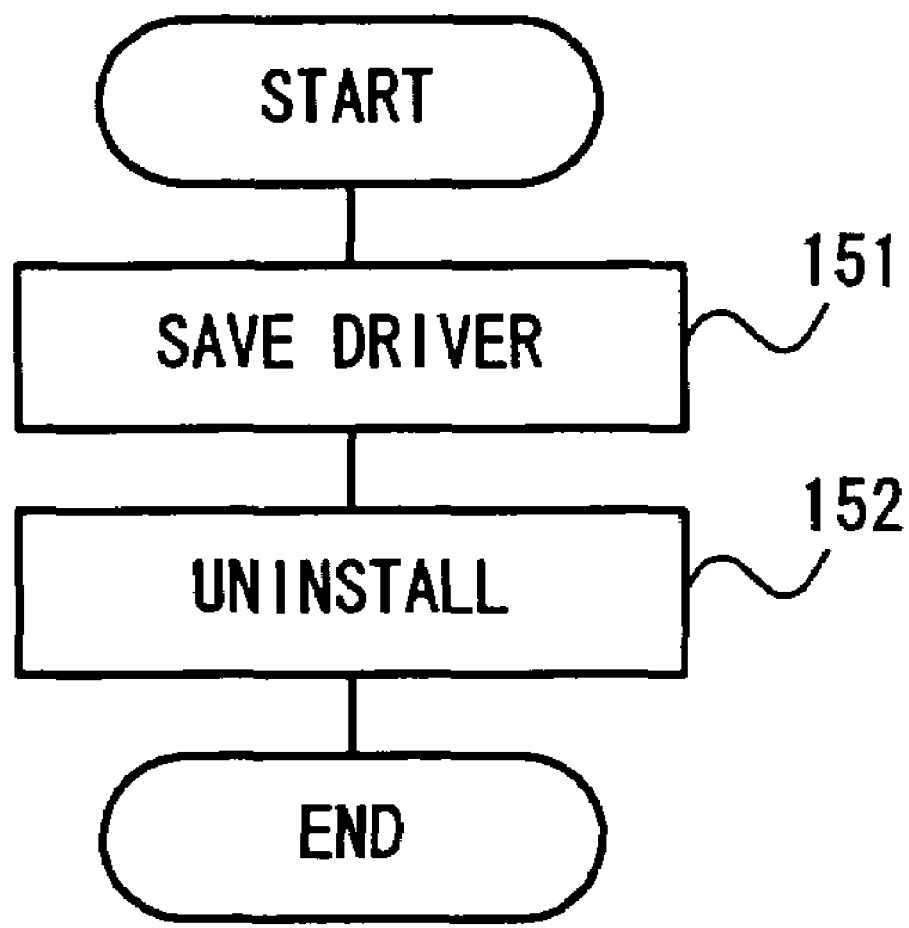
FIG. 6 is a flowchart illustrating the flow of disconnect processing.

Next, a description will be given of the disconnect processing by the disconnect processing section 33. FIG. 6 is a flowchart illustrating the flow of the disconnect processing.

When the disconnect processing section 33 starts disconnect processing, the save processing unit 39 first saves the driver (Step 151). The driver which is saved is one which corresponds to an output device available in the disconnected network, i.e., a driver which was installed or restored and installed in the connect processing. In the saving of the driver, the group of files constituting that driver is moved to the driver-information storing section 34, and additionally the setting for that driver is stored in the driver-information storing section 34 as the setting information. However, the group of files constituting the driver need not necessarily be saved. In this case, if the setting information is left stored in the driver-information storing section 34, in the restore and install processing by the restore processing unit 37 in the aforementioned Step 132 it is possible to restore the using environment of the output device by newly installing the driver and providing a setting based on the setting information.

Then, in the disconnect processing section 33, upon completion of the driver save processing by the save processing unit 39, the delete processing unit 38 uninstalls that driver (Step 152), thereby completing the disconnect processing.

Next, a description will be given of the driver information which is stored in the driver-information storing section 34. FIGS. 7A and 7B are diagrams illustrating examples of the driver information.

The driver information shown in FIGS. 7A and 7B is information which is stored when the connect processing section 32 has newly installed a driver (refer to Step 136 in FIG. 5), and is information which correlates the network and the output device connected to that network. Information indicating the network is information capable of specifying the network, and a network address, for instance, can be used therefor. In addition, information indicating the output device is information capable of specifying the output device, and an IP address, for instance, can be used therefor.

The driver information shown in FIG. 7A is the setting information which is stored (refer to Step 151 in FIG. 6) when the disconnect processing section 33 saved the driver, and it is information indicating settings for the respective drivers. The driver information shown in FIG. 7B is used in the restore and install processing at the time of the connect processing.

By virtue of such a configuration, when, for example, the terminal device 3 is connected for the first time to the network 5C shown in FIG. 2, drivers of the output device 1C-1 and the output device 1C-2 are newly installed. Subsequently, if the terminal device 3 is connected to the network 5B, the drivers of the output device 1C-1 and the output device 1C-2 are saved, and the driver of the output device 1B is newly installed. Further after that, if the terminal device 3 is connected to the network 5C, the driver of the output device 1B is saved, and the drivers of the output device 1C-1 and the output device 1C-2 are restored and installed.

Second Embodiment

In a second embodiment, a description will be given of a case where when, at the time of the connect processing described in the first embodiment, detection is impossible due to such reasons as a cutoff of the power supply of the output device or the removal of the output device itself, the user is requested to confirm whether or not the driver of that output device is to be restored and installed. Accordingly, since configurations other than connect processing are similar to those in the case of the first embodiment, a description will be given here of only the flow of the connect processing.

Figure 8:
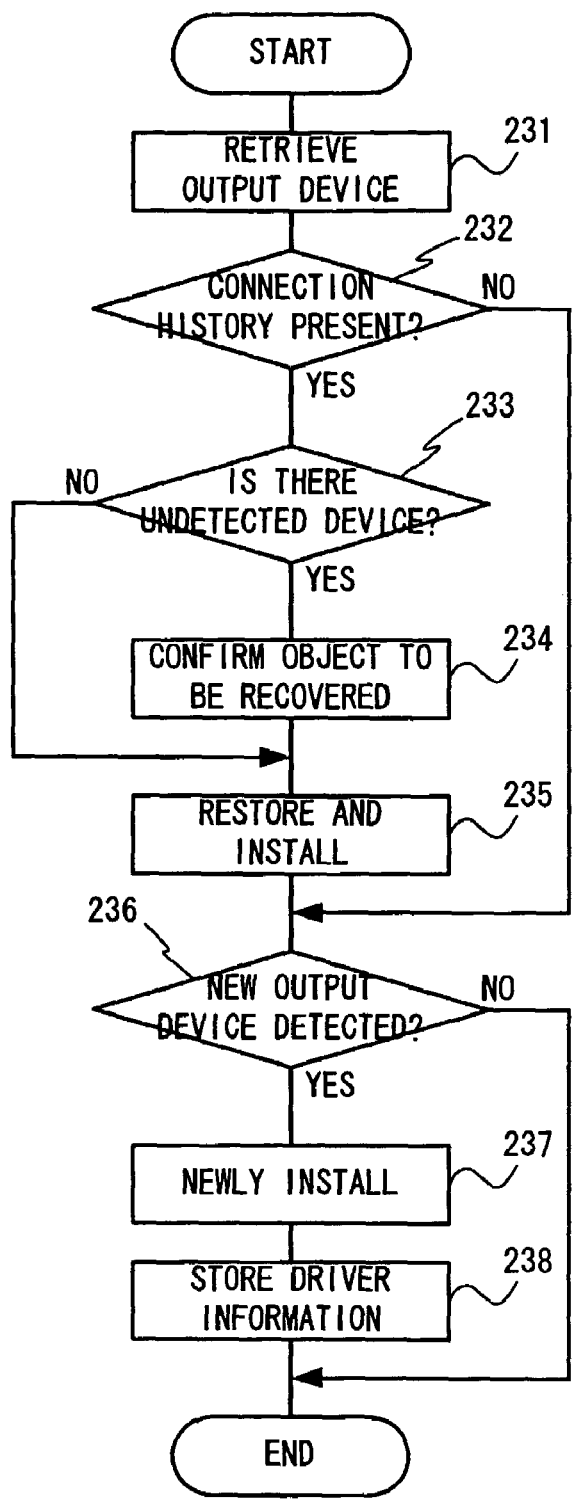
FIG. 8 is a flowchart illustrating the flow of connect processing in accordance with a second embodiment.

FIG. 8 is a flowchart illustrating the flow of connect processing in accordance with the second embodiment.

When the connect processing section 32 starts the connect processing, the retrieve processing unit 36 first retrieves an output device available in the connected network (Step 231).

Subsequently, by referring to the driver information stored in the driver-information storing section 34, the connect processing section 32 determines whether or not the connection to the connected network was carried out in the past. As a result of it, if there is a past connection to the connected network (YES in Step 232), and if there is an output device which was not detected in Step 231 among the output devices which correspond to this network and whose drivers can be restored and installed (YES in Step 233), the connect processing section 32 requests the user to confirm whether or not to restore and install the driver of that output device (Step 234). This confirmation is made by a method such as giving a display on an unillustrated display unit of the terminal device 3.

If the confirmation is made by the user, the restore processing unit 37 executes the restore and install processing in accordance with the content of confirmation (Step 235).

On the other hand, if there is no output device which was not detected in Step 231 (NO in Step 233), the restore processing unit 37 executes the restore and install processing with respect to the drivers corresponding to all the output devices (Step 235).

Upon completion of the restore and install processing, or if there was no past connection to the connected network (NO in Step 232), and if an output device which is new in Step 231 has been detected, i.e., an output device corresponding to a driver which is not stored in the driver-information storing section 34 and which could not be restored and installed has been detected (YES in Step 236), the build-in processing unit

35 newly installs the driver of that output device (Step 237). Then, information on the installed driver is stored in the driver-information storing section 34 (Step 238), thereby completing the connect processing.

Third Embodiment

In a third embodiment, a description will be given of a case where when plural output devices have been detected at the time of the connect processing described in the first embodiment, an output device to be restored and installed or to be newly installed is selected on the basis of conditions designated in advance. Accordingly, since configurations other than connect processing are similar to those in the case of the first embodiment, a description will be given here of only the flow of the connect processing.

Here, a description will be given of a case where use is made of the designation of the type of output device, such as color and monochrome, and the selection by the user on each occasion.

Figure 9:
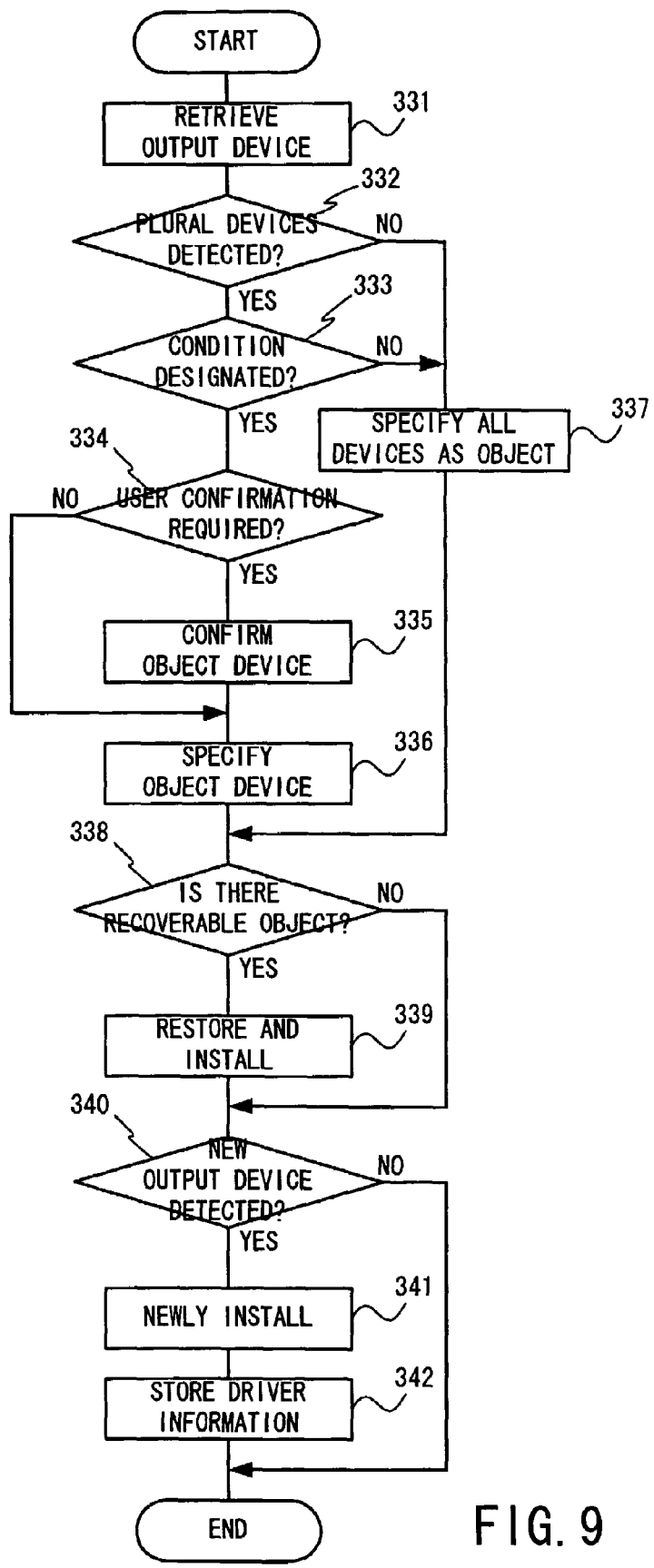
FIG. 9 is a flowchart illustrating the flow of connect processing in accordance with a third embodiment.

FIG. 9 is a flowchart illustrating the flow of connect processing in accordance with the third embodiment.

When the connect processing section 32 starts the connect processing, the retrieve processing unit 36 first retrieves an output device available in the connected network (Step 331).

As a result of it, if plural output devices have been detected (YES in Step 332), and a condition for selecting the output device has been designated (YES in Step 333), and if that condition requires confirmation by the user (YES in Step 334), the user is requested to confirm the object device of installation (Step 335). The user specifies the output device subject to installation (Step 336). This confirmation is made by a method such as giving a display on an unillustrated display unit of the terminal device 3.

On the other hand, if the condition for selecting the output device does not require confirmation by the user (NO in Step 334), the connect processing section 32 specifies the output device subject to installation in accordance with that condition (Step 336).

Meanwhile, if the condition for selecting the output device has not been designated (NO in Step 333), or if plural output devices have not been detected (NO in Step 332), all the output devices detected by the retrieve processing unit 36 are specified as being subject to installation (Step 337).

After the output device subject to installation is specified, by referring to the driver information stored in the driver-information storing section 34, the connect processing section 32 determines whether or not an output device which can be restored and installed is included among the specified output devices, and if an output device which can be restored and installed is included (YES in Step 338), the restore processing unit 37 executes the restore and install processing (Step 339).

In addition, if there is an output device which was newly detected in Step 331 among the specified output devices (YES in Step 340), the build-in processing unit 35 newly installs the driver of that output device (Step 341). Then, information on the installed driver is stored in the driver-information storing section 34 (Step 342), thereby completing the connect processing.

What is claimed is:

1. A driver managing method executing in a device using a driver managing apparatus for managing a driver, the method comprising:

monitoring a change in a network environment of the device including a presence or absence of a connection to a network;

detecting an output device connected to the network when the connection of the device to the network has been confirmed, and then installing a driver corresponding to the output device, determining, upon starting connect processing, whether connection to the network was carried out in the past based on whether a network address of the network is stored in a driver-information storing unit, and executing restore and install processing if the determination is made that there was connection to the network carried out in the past;

wherein when a disconnection of the device from the network has been detected by the monitoring, driver information for restoring the driver to an installed state, the driver information corresponding to the output device, is saved in immediate response to the disconnection, and the driver is subsequently uninstalled.

2. The driver managing method according to claim 1, wherein if the driver information for restoring the driver to an installed state, and corresponding to the output device, has been saved in the device, the driver is restored based on the saved driver information.

3. The driver managing method according to claim 2, wherein if the output device corresponding to the saved driver information has not been detected, a determination is made on whether or not restoration of the driver corresponding to the output device is required in accordance with an instruction by a user.

4. The driver managing method according to claim 1, wherein if a plurality of output devices has been detected, and the driver fits a condition designated in advance which distinguishes the driver from among other drivers corresponding to other ones of the plurality of output devices, then the driver is installed.

5. The driver managing method according to claim 1, wherein the driver information for restoring the driver to an installed state is saved in an uninstalled state.

6. A driver managing apparatus executing in a device for managing a driver, the apparatus comprising:

a network-environment monitoring unit which monitors a change in a network environment of the device including a presence or absence of a connection to a network;

a connect processing unit which detects an output device connected to the network when the connection of the device to the network has been detected by the network-environment monitoring unit, and then installs the driver corresponding to the output device;

a disconnect processing unit which, if a disconnection from the network has been detected by the network-environment monitoring unit, saves driver information for restoring the driver to an installed state, the driver information corresponding to the output device, in immediate response to the disconnection, and subsequently uninstalls the driver; and a driver-information storing unit which stores the driver information saved by the disconnect processing unit, wherein the connect processing unit determines, upon starting connect processing, whether connection to the network was carried out in the past based on whether a network address of the network is stored in the driver-information storing unit, and if the determination is made that there was connection to the network carried out in the past, the driver managing apparatus executes restore and install processing.

7. The driver managing apparatus according to claim 6, wherein if the driver information for restoring the driver to an installed state, and corresponding to the output device, is stored in the driver-information storing unit, the connect processing unit restores the driver based on the stored driver information.

8. The driver managing apparatus according to claim 7, wherein if the output device corresponding to the driver information stored in the driver-information storing unit has not been detected, the connect processing unit determines whether or not restoration of the driver corresponding to the output device is required in accordance with an instruction by a user.

9. The driver managing apparatus according to claim 6, wherein if a plurality of output devices has been detected, and the driver fits a condition designated in advance which distinguishes the driver from among other drivers corresponding to other ones of the plurality of output devices, then the driver is installed.

10. The driver managing apparatus according to claim 6, wherein the disconnect processing unit saves the driver information for restoring the driver to an installed state in an uninstalled state.

11. The driver managing apparatus according to claim 6, wherein if the determination is made that there was no connection to the network in the past, the driver managing apparatus does not execute the restore and install processing.

12. A recording medium readable by a device storing a driver managing program for managing a driver, the driver managing program performing a process comprising:
   a network-environment monitoring step of monitoring a change in a network environment of the device including a presence or absence of a connection to a network;
   a connect processing step of detecting an output device connected to the network when the connection of the device to the network has been detected in the network-environment monitoring step, and then installing, in response to the detecting, the driver corresponding to the output device;
   a determining step of determining, upon starting connect processing, whether connection to the network was carried out in the past based on whether a network address of the network is stored in a driver-information storing unit;
   an executing step of executing restore and install processing if the determination is made that there was connection to the network carried out in the past;
   a disconnect processing step of, if a disconnection from the network has been detected in the network-environment monitoring step, saving driver information for restoring the driver to an installed state, the driver information corresponding to the output device, in immediate response to the disconnection, and subsequently uninstalling the driver; and
   a driver-information storing step of storing, in the driver information storing unit, the driver information saved in the disconnect processing step,
   wherein the device executes the network-environment monitoring step and the connect processing step and further executes the disconnect processing step and the driver-information storing step.

13. The process of the driver managing program according to claim 12, wherein the driver is restored, in the connect processing step, based on the stored driver information for restoring the driver to an installed state if the driver information for restoring the driver to an installed state is stored in the driver-information storing unit.

14. The process of the driver managing program according to claim 13, wherein a determination is made on whether or not restoration of the driver corresponding to the output device is required in accordance with an instruction by a user in the connect processing step if the output device corresponding to the driver information stored in the driver-information storing unit has not been detected.

15. The driver managing program according to claim 12, wherein if a plurality of output devices has been detected, and the driver fits a condition designated in advance which distinguishes the driver from among other drivers corresponding to other ones of the plurality of output devices, then the driver is installed.

16. The driver managing program according to claim 12, wherein in the disconnect processing step, the driver information for restoring the driver to an installed state is saved in an uninstalled state.

* * * * *